US 11,459,107 B2

(12) United States Patent
Chantal et al.

(10) Patent No.: US 11,459,107 B2
(45) Date of Patent: Oct. 4, 2022

(54) AIRCRAFT HAVING A SPECIFIC ARRANGING MODULE

(71) Applicant: AIRBUS INTERIORS SERVICES, Toulouse (FR)

(72) Inventors: Béranger Chantal, Bretx (FR); Nicolas Ferrere, Moissac (FR); Matthias Ruiz, Colomiers (FR); Amalia Martinez Martin, Toulouse (FR)

(73) Assignee: AIRBUS INTERIORS SERVICES, Toulouse (FR)

( * ) Notice: Subject to any disclaimer, the term of this patent is extended or adjusted under 35 U.S.C. 154(b) by 1101 days.

(21) Appl. No.: 16/050,443

(22) Filed: Jul. 31, 2018

(65) Prior Publication Data

US 2019/0039737 A1 Feb. 7, 2019

(30) Foreign Application Priority Data

Aug. 2, 2017 (FR) ...................................... 1757429

(51) Int. Cl.
*B64D 11/06* (2006.01)
*B64D 11/00* (2006.01)

(52) U.S. Cl.
CPC .......... *B64D 11/0606* (2014.12); *B64D 11/00* (2013.01); *B64D 2011/0046* (2013.01); *B64D 2011/0069* (2013.01)

(58) Field of Classification Search
CPC .......... B64D 11/0602; B64D 11/06064; B64D 11/0606; B64D 2011/0046
See application file for complete search history.

(56) References Cited

U.S. PATENT DOCUMENTS

| 5,024,398 A | * | 6/1991 | Riedinger | .......... B64D 11/0602 244/118.5 |
| 5,083,727 A | | 1/1992 | Pompei et al. | |
| 7,299,511 B2 | | 11/2007 | Quan | |
| 7,934,679 B2 | * | 5/2011 | Bock | .................. B64D 11/0604 244/118.6 |
| 2007/0108346 A1 | | 5/2007 | Zwaan | |

(Continued)

FOREIGN PATENT DOCUMENTS

| DE | 102009018690 | 10/2010 |
| DE | 102015116585 | 3/2017 |

(Continued)

OTHER PUBLICATIONS

French Search Report, dated Mar. 26, 2018, priority document.

*Primary Examiner* — Richard R. Green
(74) *Attorney, Agent, or Firm* — Greer, Burns & Crain, Ltd.

(57) ABSTRACT

An aircraft including a cabin inside which a floor is installed, and at least one arranging module which is fixed solely to the floor and which includes a front wall, a rear wall, a port-side wall and a starboard-side wall which are rigidly connected to one another. The port-side and starboard-side walls each have a door, a roof and a deck fixed to each of the front, rear, port-side and starboard-side walls, and a separating system which makes it possible to separate the internal volume of the arranging module into two volumes, each being accessible through one of the doors. Such an aircraft therefore provides an arranging module which is fixed solely to the floor of the cabin, thereby facilitating the set-up thereof.

5 Claims, 4 Drawing Sheets

(56) References Cited

U.S. PATENT DOCUMENTS

| | | | |
|---|---|---|---|
| 2012/0273614 A1 | 11/2012 | Ehlers et al. | |
| 2016/0009395 A1* | 1/2016 | Savian | B64D 11/02 |
| | | | 244/118.5 |
| 2016/0052633 A1* | 2/2016 | Lawson | B64D 11/0604 |
| | | | 244/118.6 |
| 2016/0059966 A1* | 3/2016 | Dryburgh | B64D 11/0604 |
| | | | 244/118.6 |
| 2016/0272323 A1* | 9/2016 | Carlioz | B64D 11/0604 |
| 2017/0144764 A1* | 5/2017 | Moran | B64D 11/0602 |
| 2018/0281964 A1* | 10/2018 | Carlioz | B64D 11/0604 |
| 2019/0248498 A1* | 8/2019 | Kimizuka | B64D 11/0602 |

FOREIGN PATENT DOCUMENTS

| | | | |
|---|---|---|---|
| FR | 3079495 A1 * | 10/2019 | B64D 11/0604 |
| WO | 2004069657 | 8/2004 | |

* cited by examiner

AIRCRAFT HAVING A SPECIFIC ARRANGING MODULE

CROSS-REFERENCES TO RELATED APPLICATIONS

This application claims the benefit of the French patent application No. 1757429 filed on Aug. 2, 2017, the entire disclosures of which are incorporated herein by way of reference.

TECHNICAL FIELD

The present invention relates to an aircraft including at least one specific arranging module which has a self-supporting structure and is fixed to the floor of the aircraft.

BACKGROUND OF THE INVENTION

In some aircraft, the internal arrangement makes it possible to ensure better passenger comfort by providing individual cabins. Each cabin is equipped with, among other things, a bed and includes walls which are fixed to the floor and to the ceiling of the aircraft cabin.

Although such cabins are entirely satisfactory, the mode of fixing the walls requires attachments to the ceiling and to the floor to be provided, which results in relatively long and sometimes complex installation times.

SUMMARY OF THE INVENTION

An object of the present invention is to propose an aircraft including at least one internal arranging module which has walls fixed solely to the floor of the aircraft.

To this end, an aircraft is proposed including:
a cabin inside which a floor is installed, and
at least one arranging module which is fixed solely to the floor and which includes:
  a front wall, a rear wall, a port-side wall and a starboard-side wall which are rigidly connected to one another, wherein the port-side and starboard-side walls each have a door,
  a roof fixed to each of the front, rear, port-side and starboard-side walls,
  a deck fixed to each of the front, rear, port-side and starboard-side walls, and
  a separating system which makes it possible to separate the internal volume of the arranging module into two volumes, each being accessible through one of the doors.

Such an aircraft therefore proposes an arranging module which is fixed solely to the floor of the cabin, thereby facilitating the set-up thereof.

Advantageously, each port-side and starboard-side wall is hollow and has a housing in which the door can slide.

Advantageously, the separating system includes a separating wall which is fixed to the roof, to the deck and to the front and rear walls.

Advantageously, the separating wall has, at the bottom part, a lower bar which extends between the front wall and the rear wall and which is fixed to the deck, to the front wall and the rear wall, at the top part, an upper panel which extends between the front wall and the rear wall and which is fixed to the roof, to the front wall and the rear wall, and two openings placed between the lower bar and the upper panel, the separating system includes two shells, one of the shells is positioned in one of the volumes facing one of the openings and is fixed to the separating wall and to the front wall, and the other shell is positioned in the other volume facing the other opening and is fixed to the separating wall and to the rear wall, and each shell has an indentation which extends the opening facing which said shell is fixed, such as to create a recess which is produced in the volume in which said shell is positioned and which can be accessed through the opening from the other volume.

Advantageously, for each recess, the arranging module includes a bed which extends from one of the volumes as far as into the recess through the opening.

Advantageously, the aircraft includes two arranging modules placed one in front of the other, the rear wall of the arranging module which is in front has a first window therein, the front wall of the arranging module which is behind has a second window therein, the two windows are located facing one another, and each window is equipped with an obstructing device that can be moved between an open position in which the window is clear and a closed position in which the window is obstructed.

Advantageously, one of the volumes of the arranging module which is in front has the bed thereof against the rear wall thereof, and the volume which is on the same side and which belongs to the arranging module that is behind has the bed thereof against the front wall thereof.

BRIEF DESCRIPTION OF THE DRAWINGS

The features of the invention that are mentioned above, as well as others, will emerge more clearly upon reading the following description of an exemplary embodiment, said description being given with reference to the appended drawings, wherein.

DETAILED DESCRIPTION OF THE PREFERRED EMBODIMENTS

Figure 1:
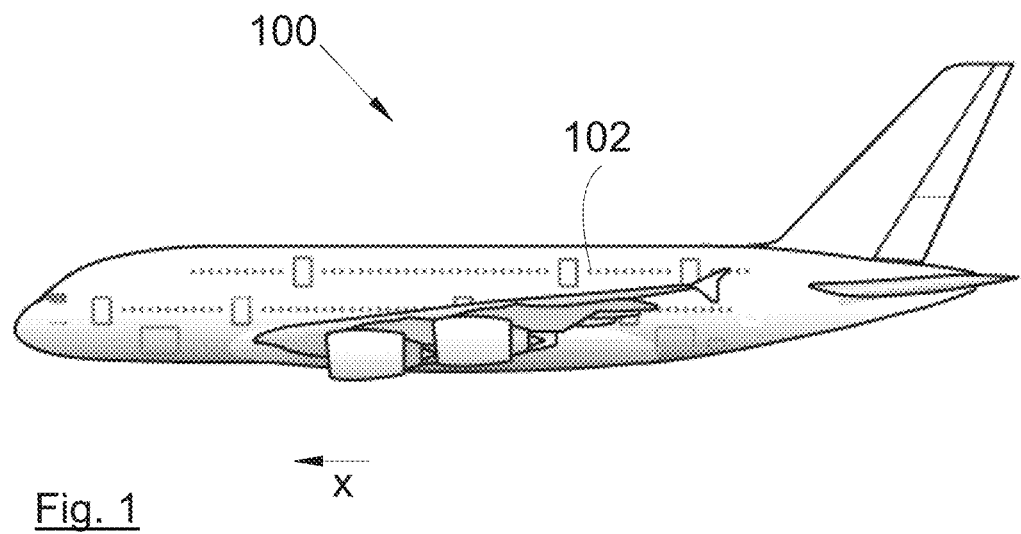
FIG. 1 is a side view of an aircraft according to the invention.

In the following description, the terms relating to a position are taken with reference to an aircraft in a normal position of use, i.e., as it is shown in FIG. 1, with the normal forward movement direction (X) thereof orientated towards the left. The normal forward movement direction is parallel to the longitudinal axis of the aircraft 100.

FIG. 1 shows an aircraft 100 which includes a cabin 102.

Figure 2:
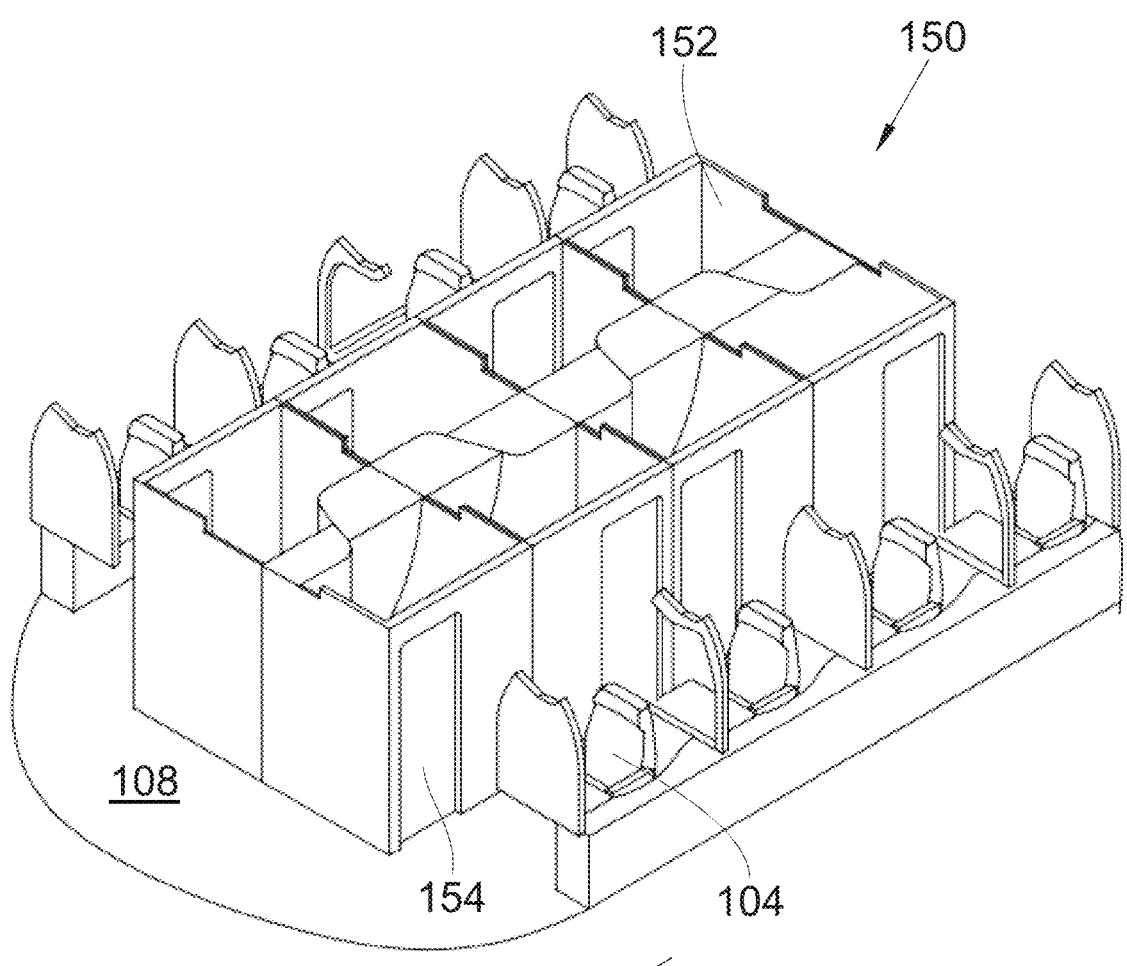
FIG. 2 is an overview, in perspective, of an internal arrangement of an aircraft according to the invention.

FIG. 2 shows the inside of the cabin 102. Inside the cabin 102, a floor 108 is installed, on which seats 104 are fixed. In the invention embodiment presented in FIG. 2, there are two rows of seats 104, one of which is placed at the port-side and the other of which is placed at the starboard-side. Between the two rows of seats 104 is placed an internal arrangement 150 that includes a plurality of arranging modules 152 according to the invention.

Figure 3:
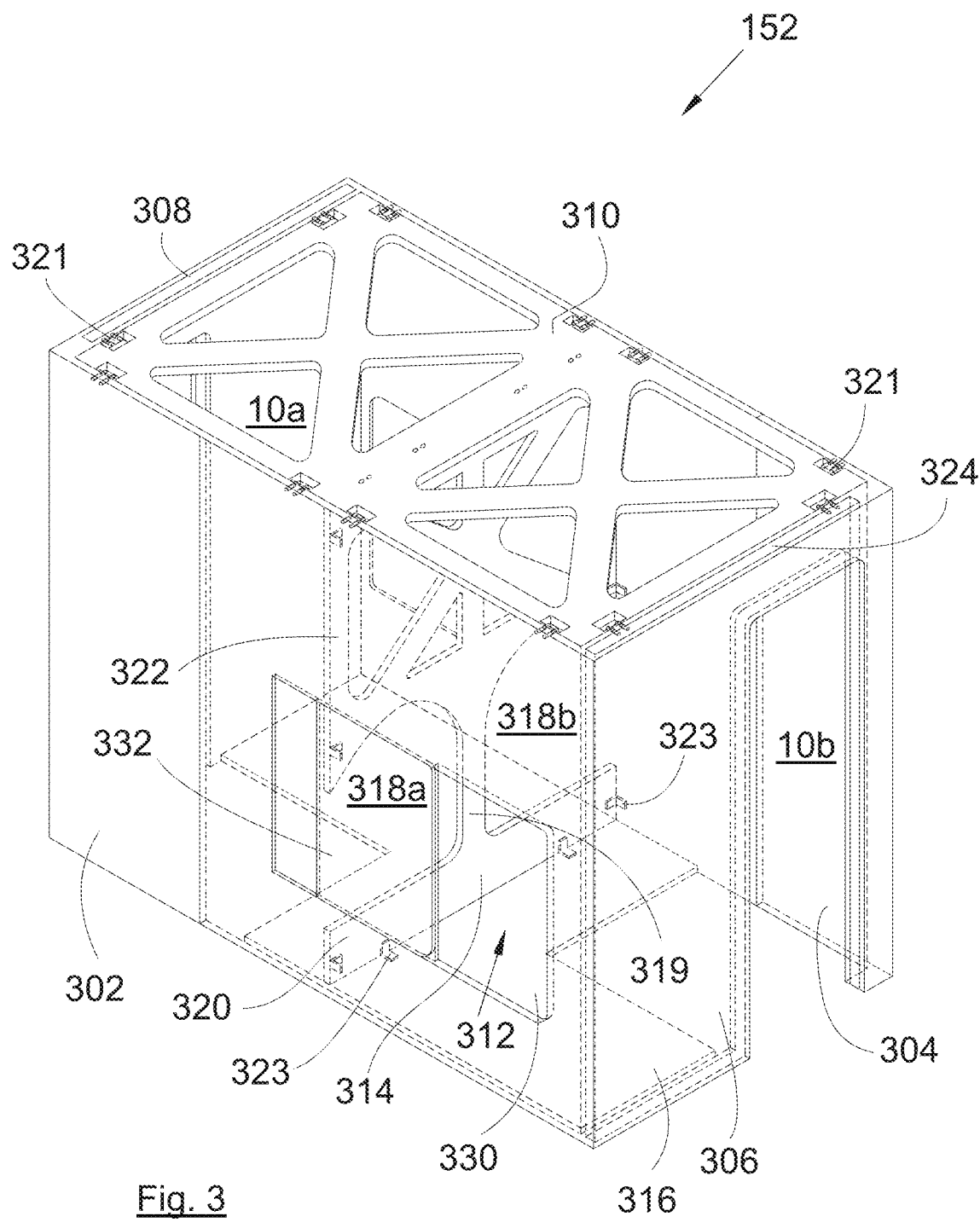
FIG. 3 is a perspective and partially transparent view of an arranging module according to the invention.
Figure 4:
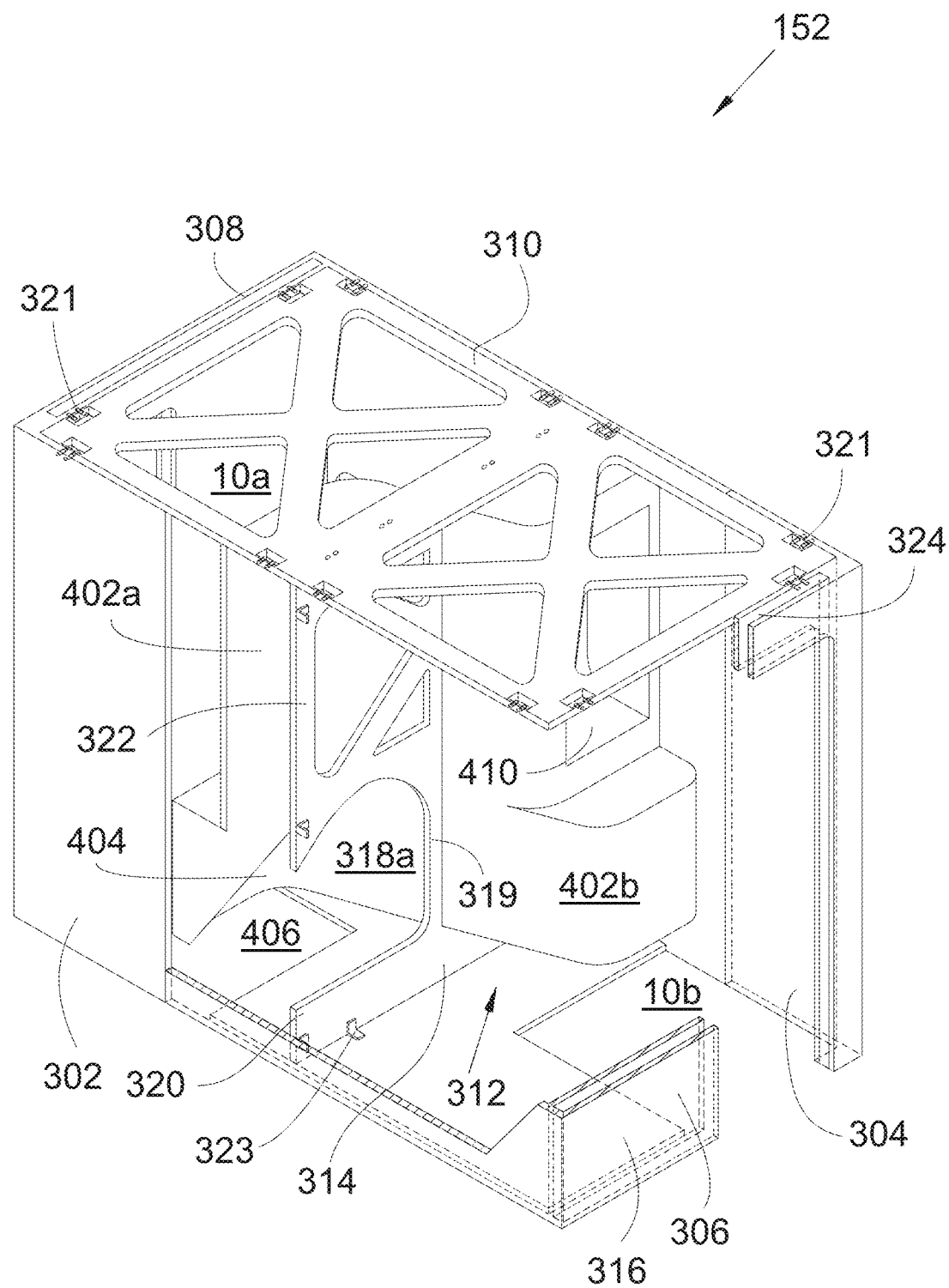
FIG. 4 is a perspective view with walls cut away from the arranging module of FIG. 3 when arranging boxes are set up.
Figure 5:
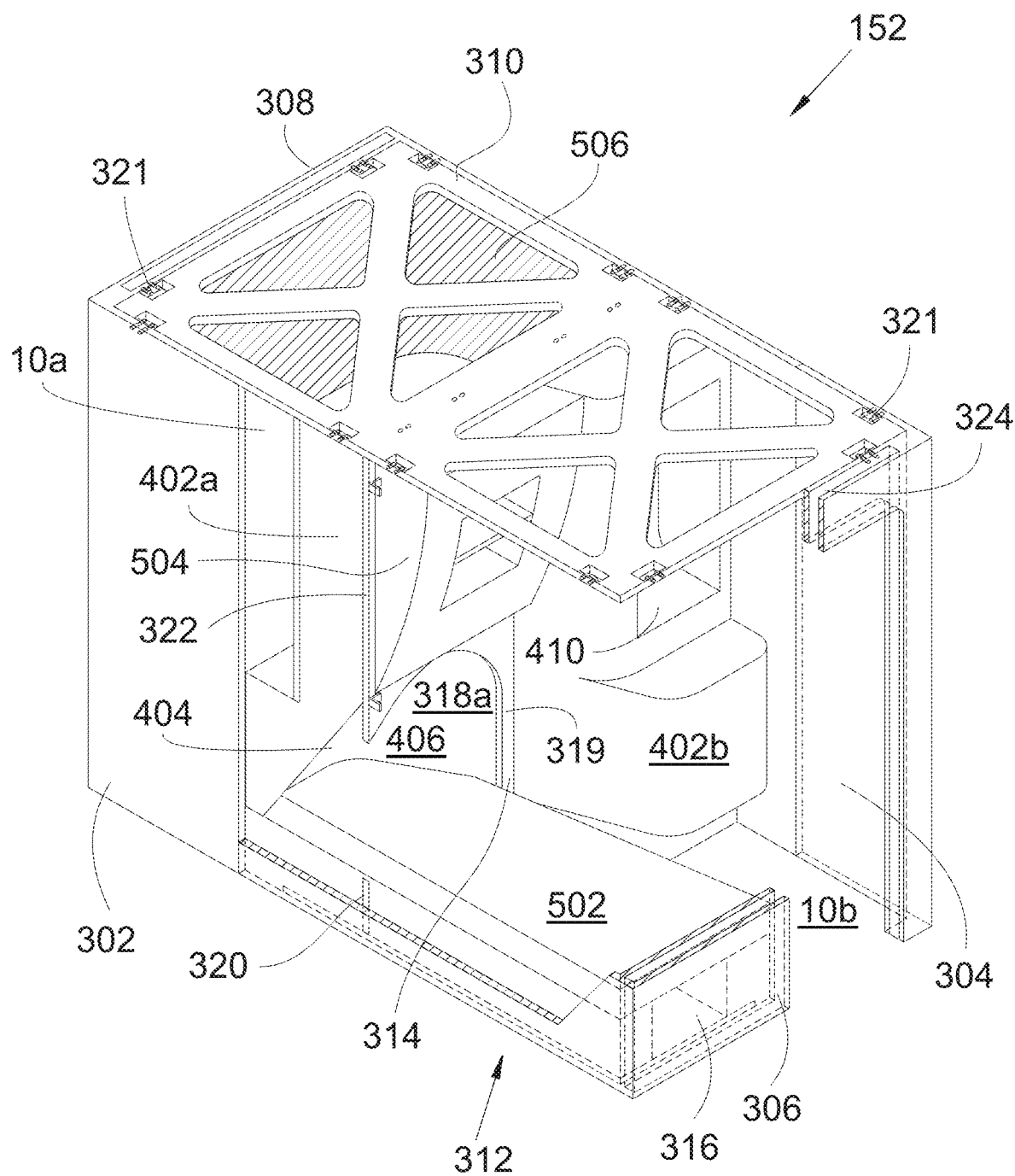
FIG. 5 is a view similar to that of FIG. 4 when a bed is set up.

FIGS. 3 to 5 show various steps of producing an arranging module 152.

The arranging module 152 takes the form of a rectangular parallelepiped that includes a front wall 302 orientated toward the front of the aircraft 100, a rear wall 304 orientated toward the rear of the aircraft 100, a port-side wall 306 and a starboard-side wall 308. These various walls are rigidly connected to one another.

The port-side 306 and starboard-side 308 walls each have a door 154 (FIG. 2, and not shown in FIGS. 3-5).

The arranging module 152 also includes a roof 310 which closes the upper face of the rectangular parallelepiped and which is fixed to each of the front 302, rear 304, port-side 306 and starboard-side 308 walls.

The arranging module 152 also includes a deck 316 which closes the lower face of the rectangular parallelepiped and which is fixed to each of the front 302, rear 304, port-side 306 and starboard-side 308 walls.

The arranging module 152 also has a separating system 312 which makes it possible to separate the internal volume of the arranging module 152 into two volumes, namely a port-side volume 10b and a starboard-side volume 10a, each being accessible through one of the doors 154. The arranging module 152 is thus divided into two volumes 10a-b and makes it possible to provide an individual space for two passengers.

Due to this specific structure, namely the fixing of the various walls 302-308, of the deck 316 and of the roof 310, to one another, the arranging module 152 is self-supporting and therefore only requires fixings to the floor 108 of the aircraft 100 and no longer requires fixing to the ceiling. The arranging module 152 is fixed to the floor 108 by fixing the deck 316 and the front 302, rear 304, port-side 306 and starboard-side 308 walls to said floor 108.

In the invention embodiment presented in FIGS. 2 to 5, the front 302, rear 304, port-side 306 and starboard-side 308 walls form a single-piece assembly, but it is possible for these various walls to be independent and then fixed to one another.

The separating system 312 includes, among other elements, a separating wall 314 which extends parallel to the longitudinal axis of the aircraft 100 and which is fixed to the roof 310, to the deck 316 and to the front 302 and rear 304 walls.

The fixings of the various walls 302-308, of the roof 310, of the deck 316, and of the separating wall 314 to one another and to the floor 108 are provided by any appropriate fixing systems, such as screw-and-nut 321, and/or bracket 323 systems, for example.

In the invention embodiment presented in FIGS. 2 to 5, a door 154 is, in this case, mounted in a sliding manner inside the port-side wall 306 and the starboard-side wall 308. To this end, the port-side wall 306 and the starboard-side wall 308 are hollow and each have a housing 324 in which the door 154 can slide in order to move from an open position to a closed position, and vice versa.

FIGS. 3 to 5 show a specific embodiment of the separating system 312 wherein the separating wall 314 has, at the bottom part, a lower bar 320 which extends between the front wall 302 and the rear wall 304 and which is fixed to the deck 316, to the front wall 302 and the rear wall 304, at the top part, an upper panel 322 which extends between the front wall 302 and the rear wall 304 and which is fixed to the roof 310, to the front wall 302 and the rear wall 304, and two openings 318a-b placed between the lower bar 320 and the upper panel 322. The two openings 318a-b are separated by a central rod 319 which connects the lower bar 320 to the upper panel 322.

The separating system 312 also includes two shells 402a-b. One of the shells 402a is positioned in one of the volumes 10a facing one of the openings 318a and is fixed to the separating wall 314 and the front wall 302, and the other shell 402b is positioned in the other volume 10b facing the other opening 318b and is fixed to the separating wall 314 and the rear wall 304.

Each shell 402a-b has an indentation 404 which extends the opening 318a-b facing which said shell 402a-b is fixed, such as to create a recess 406 which is produced in the volume 10a-b in which said shell 402a-b is positioned and which can be accessed through the opening 318a-b from the other volume 10b-a.

As shown in FIG. 5, such a layout allows for setting up a bed 502 which extends from one of the volumes 10a-b as far as into the recess 406 through the opening 318a-b, while providing separation with regard to the other volume 10b-a. The two beds 502 are then parallel and one is placed against the rear wall 304 and the other is placed against the front wall 302.

The shell 402a-b can also be equipped with a cupboard 410 which can be accessed from the volume 10a-b in which the shell is fixed.

A covering additional element 504 can be fixed to the separating wall 314 above each opening 318a-b in order to hide the separating wall 314. This covering additional element 504 can be equipped, for example, with shelving or be used as a screen support.

In order to hide the roof 310, from inside the arranging module 152, a decorative panel 506 can be positioned under the roof 310 such as to fill in the space between the front 302, rear 304, port-side 306 or starboard-side 308 walls, the separating wall 314 and the shell 402a-b.

When two arranging modules 152 are placed one in front of the other, it can be desirable for the two persons who are next to one another but in different arranging modules 152 to be able to freely communicate. It is then desirable for the two arranging modules 152 to be symmetrical with respect to one another such that the beds 502 of the same volumes 10a-b, i.e., port-side 10b or starboard-side 10a, but of the different arranging modules 152, are located next to another. Of course in this case, the other two beds 502 are spaced apart from one another, i.e., the beds of the starboard-side 10a or port-side 10b volumes.

One of the volumes 10a-b, port-side 10b or starboard-side 10a, of the arranging module 152 which is in front then has the bed 502 thereof against the rear wall 304 thereof and the volume 10a-b which is on the same side, port-side 10b or starboard-side 10a, and which belongs to the arranging module 152 which is behind then has the bed 502 thereof against the front wall 302 thereof.

The arranging module 152 which is in front has the rear wall 304 thereof against the front wall 302 of the arranging module 152 which is behind.

For the person who is in the arranging module 152 which is in front to be able to communicate with the person who is in the arranging module 152 which is behind, the rear wall 304 of the arranging module 152 which is in front has a first window therein and the front wall 302 of the arranging module 152 which is behind has a second window 330 therein which is located to face the first window and each window 330 is equipped with an obstructing device 332 which can be moved between an open position in which the window 330 is clear and a closed position in which the window 330 is obstructed.

In the invention embodiment presented in FIG. 3, the obstructing device 332 can be translated parallel to the wall which bears it.

For reasons of weight, the roof 310 and the separating wall 314 are apertured in this case.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft including:
    a cabin, inside which a floor is installed, and
    at least one arranging module fixed solely to the floor and which includes:
        a front wall, a rear wall, a port-side wall and a starboard-side wall rigidly connected to one another, wherein the port-side and starboard-side walls each have a door,
        a roof fixed to each of the front, rear, port-side and starboard-side walls,
        a deck fixed to each of the front, rear, port-side and starboard-side walls, and
        a separating system configured to separate an internal volume of the arranging module into two volumes, each being accessible through one of the doors, wherein the separating system includes a separating wall fixed to the roof, to the deck, and to the front and rear walls, and wherein the separating wall comprises:
            at a bottom part, a lower bar which extends between the front wall and the rear wall and which is fixed to the deck, to the front wall and the rear wall,
            at a top part, an upper panel which extends between the front wall and the rear wall and which is fixed to the roof, to the front wall and the rear wall, and
            two openings placed between the lower bar and the upper panel,
        wherein the separating system includes two shells,
            wherein one of the shells is positioned in one of the volumes facing one of the openings and is fixed to the separating wall and to the front wall, and the other shell is positioned in the other volume facing the other opening and is fixed to the separating wall and to the rear wall,
        wherein each shell has an indentation which extends the opening facing which said shell is fixed, such as to create a recess which is produced in the volume in which said shell is positioned and which can be accessed through the opening from the other volume,
        wherein, for each recess, the arranging module includes a bed which extends lengthwise orthogonally to a longitudinal axis of the aircraft from one of the volumes as far as into the recess through the opening, and
        wherein each said door is parallel to said longitudinal axis and offset from each said bed in a direction parallel to the longitudinal axis.

2. The aircraft according to claim 1, wherein each port-side and starboard-side wall is hollow and has a housing configured to slidingly receive the door.

3. The aircraft according to claim 1, further comprising two arranging modules placed one in front of the other,
    wherein the rear wall of the arranging module which is in front has a first window therein,
    wherein the front wall of the arranging module which is behind has a second window therein,
    wherein the two windows are located facing one another, and
    wherein each window is equipped with an obstructing device that can be moved between an open position in which the window is clear and a closed position in which the window is obstructed.

4. The aircraft according to claim 3, wherein one of the volumes of the arranging module which is in front has the bed thereof against the rear wall thereof, wherein the volume which is on the same side and which belongs to the arranging module that is behind has the bed thereof against the front wall thereof.

5. The aircraft according to claim 1, further comprising two arranging modules placed one in front of the other,
    wherein the rear wall of the arranging module which is in front has a first window therein,
    wherein the front wall of the arranging module which is behind has a second window therein,
    wherein the two windows are located facing one another, and
    wherein each window is equipped with an obstructing device that can be moved between an open position in which the window is clear and a closed position in which the window is obstructed.

* * * * *